(12) United States Patent
Heck et al.

(10) Patent No.: US 11,333,279 B2
(45) Date of Patent: May 17, 2022

(54) TENSIONING RING WITH A TENSIONING SECTION

(71) Applicant: Hauff-Technik GmbH & Co. KG, Hermaringen (DE)

(72) Inventors: Martin Heck, Zöschingen (DE); Jörg Schmid, Langenau (DE); Ralf Kurz, Giengen (DE)

(73) Assignee: Hauff-Technik GmbH & Co. KG, Hermaringen (DE)

( * ) Notice: Subject to any disclaimer, the term of this patent is extended or adjusted under 35 U.S.C. 154(b) by 0 days.

(21) Appl. No.: 16/955,360

(22) PCT Filed: Dec. 18, 2018

(86) PCT No.: PCT/EP2018/085411
§ 371 (c)(1),
(2) Date: Jun. 18, 2020

(87) PCT Pub. No.: WO2019/121627
PCT Pub. Date: Jun. 27, 2019

(65) Prior Publication Data
US 2021/0018133 A1    Jan. 21, 2021

(30) Foreign Application Priority Data
Dec. 19, 2017   (EP) .................................. 17020582

(51) Int. Cl.
*F16L 33/02*   (2006.01)
*F16B 2/04*   (2006.01)
(Continued)

(52) U.S. Cl.
CPC ............. *F16L 33/02* (2013.01); *F16L 55/163* (2013.01); *F16L 55/17* (2013.01); *F16L 55/171* (2013.01); *F16B 2/04* (2013.01); *F16B 2/14* (2013.01)

(58) Field of Classification Search
CPC ........ F16L 55/163; F16L 55/17; F16L 55/171
(Continued)

(56) References Cited

U.S. PATENT DOCUMENTS 201,603 A * 3/1878 Fitzhugh .................. B65D 9/02
217/72
2,474,062 A * 6/1949 Murphy ................ F16L 55/171
138/99

(Continued)

FOREIGN PATENT DOCUMENTS

| DE | 1109959 B | 6/1961 | |
| FR | 2076554 A5 * | 10/1971 | ........... A63B 29/024 |
| JP | S58130191 U | 9/1983 | |

*Primary Examiner* — Robert K Arundale
*Assistant Examiner* — Richard K. Durden
(74) *Attorney, Agent, or Firm* — Wood, Phillips, Katz & Mortimer

(57) ABSTRACT

The invention relates to a tensioning ring (1) having a tensioning section (3), the tensioning section (3) comprising a wedge element (6), a guide member (7a) and a tensioning screw (5), wherein a width of the tensioning section (3) and thus a circumference of the tensioning ring (1) can be changed by tightening the tensioning screw (5), for which purpose the wedge element (6) is guided at the guide member (7a) and is movable in this guide along a movement way (20a) at the guide member (7a) by tightening the tensioning screw (5), the movement way (20a) having a portion in a width direction (4) determining the width of the tensioning section (3), wherein the wedge element (6) and the guide member (7a) engage in one another with an undercut in such a way that they are held together in a form-locking manner with respect to the width direction (4).

3 Claims, 7 Drawing Sheets

(51) Int. Cl.
*F16B 2/14* (2006.01)
*F16L 55/163* (2006.01)
*F16L 55/17* (2006.01)

(58) Field of Classification Search
USPC ...... 24/25, 268, 20 R; 285/148.26, 214, 230, 285/236, 237, 370
See application file for complete search history.

(56) References Cited

U.S. PATENT DOCUMENTS

| | | |
|---|---|---|
| 2,778,085 A | 1/1957 | Bernard |
| 2,803,866 A | 8/1957 | Flora |
| 2,855,167 A | 10/1958 | Christophersen |
| 2,922,212 A | 1/1960 | Textrom |
| 3,769,665 A * | 11/1973 | McKown, Jr. .......... F16L 33/08 24/274 R |
| 5,024,404 A | 6/1991 | Ballard |
| 5,431,459 A | 7/1995 | Gundy |
| 6,394,505 B1 * | 5/2002 | Schmucki ............... E03D 11/16 277/607 |
| 2002/0140224 A1 | 10/2002 | Brockway |
| 2005/0006853 A1 | 1/2005 | Neuhaus et al. |
| 2008/0289153 A1 * | 11/2008 | Bowater ................. F16L 33/08 24/274 R |

* cited by examiner

TENSIONING RING WITH A TENSIONING SECTION

FIELD OF THE INVENTION

The present invention relates to a tensioning ring with a tensioning section.

BACKGROUND OF THE INVENTION

A tensioning ring as described here can for instance be used in a wall or floor duct, for example to press a soft, flexible sleeve against a relatively stiffer line or tube element. For this purpose, the circumference of the tensioning ring can be changed by tightening a tensioning screw, so that the tensioning ring is pressed in directions perpendicular to the ring axis, in order to press for instance the elastomer or rubber sleeve with an increasing pressure against the pipe element. This application shall illustrate the present subject matter, it shall not limit the generity of the invention.

The present invention shall solve the technical problem of specifying a particularly advantageous tensioning ring.

BRIEF SUMMARY OF THE INVENTION

According to the invention, this is solved with the tensioning ring of claim 1. The tensioning section thereof, the width of which can be changed by tightening the tensioning screw in order to change the tensioning ring circumference, comprises a wedge element and a guide member. The wedge element is guided at the guide member and can be moved in this guide at the guide part along a movement way by tightening the tensioning screw. This movement way extends proportionately in a width direction, in which the width of the tensioning section is taken. Consequently, the width of the tensioning section and thus the circumference of the tensioning ring changes when the wedge element is moved along the movement way by tightening the tensioning screw. The wedge element and the guide member are held together by a form fit in the width direction, namely engage in each other with an undercut.

Preferred embodiments are subject of the dependent claims and the whole disclosure, wherein in the description of the features no difference is made between apparatus and device or use aspects; the disclosure is to be read at least implicitly with regard to all claim categories.

The form-fit connection of the wedge element and the guide member can advantageously extend the range of applications of the tensioning ring, because it also makes a narrowing (reduction of width) possible. A form-fit is preferred such that the wedge element and the guide member are not only guided at each other in a form-fit manner when the tensioning section or tensioning ring is narrowed, but also when it is widened. For illustration purposes, as far as the idea of the invention can generally also be realized, for example, with two L-profiles hooked together forming the undercut, one of the two parts preferably provides a guide surface also in the opposite direction. In consequence, a respective tensioning ring can be used for or be adapted for being pressed radially outwards (away from the ring axis) or radially inwards (towards the ring axis). The undercut or the form-fit arrangement may possibly increase the effort required for design and production, but the advantages are still predominant.

The undercut between the wedge element and the guide member consists in a sectional plane perpendicular to the ring axis. The "ring axis" is generally the central axis of the ring shape, around which the tensioning ring circumference is taken circumferentially. The tensioning ring can for instance be rotationally symmetrically around the ring axis, at least in sectors. The width direction is perpendicular to the ring axis; with a change of the size ("width") of the tensioning section in the width direction, the circumference taken around the ring axis changes accordingly. In general, "axial", "radial" and "circumferential", as well as the corresponding directions, refer to the ring axis, unless expressly stated otherwise. Unless expressly stated otherwise, "inside" and "outside" refer to the radial directions with the ring axis as the midpoint or centerline.

As far as it is mentioned that the wedge element is "movable along a movement way at the guide member", this refers to the guide member as a "resting" reference system. Conversely, if the observer were to take the reference system of the wedge element as a reference (chosen resting), the guide member would be moved relative to it. Although in general a movement way with a (slight) curvature is also possible which would thus not only result in a (proportional) offset in the width direction, but also in a (slight) relative tilt of the wedge element and the guide part, a straight movement way is preferred. The wedge element and the guide member are thus preferably guided at each other in the manner of a linear bearing, particularity preferred in the manner of a linear plain bearing (this can be less complex than a ball or roller bearing design, which is in general also conceivable).

An advantage of the tensioning section with the wedge element can be a comparatively robust construction, which can for instance be advantageous on a construction site, but also in general in practice. On the other hand, a desired "transmission ratio" can be set comparably easy in the design by adjusting the angle between the movement way and the width direction. For example, if the angle is small, the displacement (in width direction) is large, but the force transmission (and correspondingly a producible contact pressure) is small, and vice versa at a large angle (see also below in detail).

In a preferred embodiment, the tensioning screw is aligned with its axis of rotation basically in parallel to the ring axis, i. e. tilted by no more than 10°, 5° or 2° in relation to it (increasingly preferred in the order mentioned). The smaller one of two angles included by the two axes is considered here. Particularly preferred, the ring and the rotation axis lie parallel to each other (0 degree) within the limits of usual technical accuracy. The movement way of the wedge element has a portion in the width direction and a portion perpendicular to it, which is then parallel to the axis of rotation of the tensioning screw.

Generally, this "axial" orientation of the tensioning screw can be advantageous insofar as for instance a screwing from a front face is possible during assembly. The inventors found that otherwise, if for instance a screwdriver has to be placed radially or from a circumferential direction at the tensioning screw, as in case of a tensioning clamp, the space available is often limited, i. e. the accessibility is poor. For illustration purposes, the tensioning ring can for instance be placed on a tube element that protrudes from a wall (e. g. a building wall, or a housing wall or the like), wherein the screwing is difficult when the tensioning ring is placed close to the wall surface. The latter may be necessary, for example, in order to achieve an overall compact structure; for instance, in case of a building or basement wall, space may be particularly limited in an earth trench. Expressed slightly abstractly, an axial access may be better than sideward, because for instance the tube element and/or a line extend in the axial direction so that a certain space is required there anyway (like the example of the earth trench illustrates).

In a preferred embodiment, the tensioning ring comprises a tensioning strap. This forms a section or a segment with respect to a circumference around the ring axis; it can for instance extend over an angle of at least 30°, 50°, 70°, 90°, 100° or 110°. Apart from the tensioning section or the wedge element, the tensioning strap can extend over the whole circumference, but, on the other hand, for instance modular assemblies with a plurality of tensioning straps or sections are possible as well (see in detail below), possible upper limits being for instance 170°, 150° or 130° at maximum. The tensioning strap can preferably have the shape of a flat strip, namely have a larger extension along the ring axis ("axially") than perpendicular to the ring axis ("radially"). The ratio of axial to radial extension can for instance be at least 2:1, 3:1, 4:1 or 5:1, wherein possible upper limits (independently thereof) can for instance be 100:1, 80:1, 60:1, 40:1 or 20:1 at maximum. This can also depend from the material so that for instance in case of a tensioning strap made of a synthetic material, for example polyamide, (e.g. glass-fiber reinforced), the upper limits can be lower, for instance 10:1, 8:1, 6:1 or 5:1 at maximum, wherein also smaller lower limits are possible, for instance at least 1:2 or 1:1 (the ratio of axial to radial extension is given respectively).

In a preferred embodiment, the guide member is arranged at a joint end of the tensioning strap. In other words, the tensioning strap does not extend beyond the tensioning section in the circumferential direction, i.e. does not cover the wedge element radially inwards or outwards. Generally, the tensioning strap and the guide member can be provided multi-part with respect to each other, namely can be assembled as components manufactured separately before; the tensioning strap and the guide member can for instance be screwed or riveted together, see also FIG. 6 for illustration.

In a preferred embodiment, the tensioning strap is made of metal, in particular a metal strip can be provided (see the above information on the "strip shape"). In this case, the tensioning strap itself preferably forms the guide member and is bent at the joint end for this purpose. In general, the joint end itself can lie in the plane or surface of the remaining tensioning strap, for instance an axially extending bead can be bent into the strap at the joint end. Preferably, the joint end itself is bent out, either radially inwards or radially outwards.

The integration of the tensioning strap and the guide member can help to reduce the number of components, namely reduce the complexity of assembly, which can be particularly advantageous in mass production. In addition, the corresponding bending at or bending out off the joint end is a well controlled process that can be applied in production.

In a preferred embodiment, the guide member engages in a recess in the wedge element to form the undercut, i. e. the guide member is a male and the wedge element is a female form-fit element. Generally, a female form-fit element in the present text encloses a male form-fit element or at least a section of it with respect to the width direction and also in the opposite direction, the form-fit existing both when the tensioning section or tensioning ring is narrowed and widened. The female form-fit element thus guides the male one, no matter in which direction the tensioning screw is turned.

It may be preferable for the female form-fit element to enclose the male element, or at least a section of it, radially inwards and at the same time radially outwards, which can for instance prevent undesired "jumping open" during assembly or under load. As mentioned, the wedge element preferably forms the female form-fit element in which the guide member is received (enclosed with respect to the width direction and opposite to it and preferably also radially inwards and at the same time radially outwards).

In a preferred embodiment, the guide member has the shape of an L-profile, i.e. it is L-shaped when seen in sectional planes perpendicular to the movement way. One leg of the L-profile, which extends radially inwards or radially outwards from the other leg, then forms the undercut. Preferably, the other leg of the L-profile forms a transition into the wedge element without a step, so there is no offset between said leg and an inner wall surface of the wedge element facing radially inwards or its outer wall surface facing radially outwards, at least as far as technically possible and usual fits are concerned. The guide member can extend into the wedge element at a circumferential side at a radially inner edge (offset-free with the inner wall surface) or the radially outer edge (offset-free with the outer wall surface).

A respective design can be advantageous, for example, in that a tensioning ring designed to be pressed radially outwards can be designed at least as far as possible with a smooth inner wall or a tensioning ring designed to be pressed radially outwards with an at least as far as possible smooth outer wall. In both cases, a uniform force transmission can be achieved when the tensioning ring is pressed on, which can prevent for instance local excessive force. If for instance an elastomer or rubber sleeve is pressed on, a local over stressing off the elastomer material can be prevented. Further, the offset-free design can also prevent undesired creep paths for humidity and corresponding leakage.

In a preferred embodiment, the movement way forms an acute angle with a front face of the tensioning ring, namely an angle less then 90°. The angle can for instance be at maximum 80° or 75°, with possible lower limits (independent thereof) of at least 10 or 15°, for instance. Generally, "front face" relates to an axial front face; in detail, the front face in question is the one of the two axially opposite front faces towards which the wedge element is moved during or for widening. If the tensioning section is viewed from the outside to radially inwards, there are two possibilities of taking the angle between this front face and the movement way; the angle considered here is the angle formed by the movement way with said front face at the side of the guide member (the latter is meant by "on the guide member side"), not the angle formed on the side of the wedge element, see also FIG. 5 for illustration.

Summarized and simplified, a recess defined by the guide member in the circumferential direction, in which the wedge element is arranged and guided, opens axially outwards. In case of a tensioning section with a further wedge element, which is guided axially opposite to the first wedge element at a further guide member along a further movement section (see in detail below), the two guide members or the joint end of the tensioning strap can have or form a dove tail shape when viewed radially.

In general, regardless of whether the opening narrows or widens towards the front face, the movement way preferably forms an angle off at least 15°, further and particular preferred at least 25° or 30° with an axial direction parallel to the ring axis. Advantageous upper limits, which can also be of interest independently of the lower limits and shall be disclosed respectively, are at an angle of 75°, 65° or 60°, in the order mentioned increasingly preferred. Therein, the smaller of two angles is considered, which are formed between the movement way and said direction (and which add up to (180°).

As an alternative to the acute angle discussed above, the movement way can also form an obtuse angle with the front side. Then, the recess defined by the guide member widens axially outwards. In this case, that front face towards which the wedge member is moved to reduce the width of the tensioning section or the circumference of the tensioning ring is considered.

Generally, the tensioning screw can preferably have a right-hand-thread, namely a thread that rises to the right. Likewise, for instance a standard tensioning screw can be used, which is accordingly also available at a reasonable price. Preferably, the tensioning ring is designed such that, as far as it is in particular designed for being pressed radially inwards or outwards, the corresponding narrowing (pressing inwards) or widening (pressing outwards) can be achieved by turning the tensioning screw clockwise. This can be intuitively easy for the fitter to handle. This could be achieved independently of the orientation of the movement way by choosing a tensioning screw with a left or right-hand-thread as required. Since the use of a tensioning screw with a right-hand-thread is preferred, a tensioning ring adapted to be pressed radially inwards is preferably designed with an acute angle between the movement way and the front side (on the guide member side). When tightening, the wedge element moves axially inwards, and the guide member is pulled towards the wedge element, the width being reduced.

In case of a tensioning ring adapted to be pressed outwards, an obtuse angle can be preferred instead; when the wedge element moves axially inwards upon tightening (turning clockwise) the tensioning screw with the right-hand-thread, the guide member is pushed away in the circumferential direction, such that the width increases.

In a preferred embodiment, the wedge element has a double wedge shape, which refers to the width or circumferential direction. Thus, the double wedge is guided at the first guide member on one circumferential side and at a second guide member along a second movement way on the opposite circumferential side. Since it is a double wedge, also the second movement way is tilted with respect to the axial direction, so there is a movement component in the width direction. In general, however, also a wedge element would be possible which is guided only on one circumferential side obliquely to the axial direction and is guided only axially on the other side, so that there no width variation occurs with the movement in the axial direction.

In case of the preferred double wedge shape, both sloped movement ways are aligned relative to each other so that the respective width variations sum up, namely have the same sign (no matter if increase or decrease). Preferably, the two movement ways form equally large angles with the axial direction; preferably, the movement ways are mirror-symmetrical to a mirror plane containing the ring axis. Preferably, the double wedge as such is mirror-symmetrical, at least regarding its guide surfaces provided for sliding along the guide members, preferably with respect to a mirror plane containing the ring axis. Preferably, the guide members are designed mirror-symmetrical with each other (with respect to the mirror plane containing the ring axis), at least as regards their guide surfaces at which the double wedge is guided. Preferably, also independently of any mirror symmetry, preferably also the second guide member and the double wedge engage in each other by a form fit (with respect to the width direction or in the opposite direction).

In a preferred embodiment, the double wedge is provided in a multi-part design, namely assembled from a first and a second double wedge member. Consequently, the double wedge is in particular not a monolithic part formed from the same continuous material, instead it is made of at least two, preferably exactly two parts. The first double wedge member is guided at the first guide member, the second double wedge member is guided at the second guide member. The multi-part-design can for instance be advantageous in terms of the assembly, namely simplify the threading or insertion of the double wedge into or onto the guide members, in particular in case of large transmission ratios, namely a relative large tilt between the movement ways. The double wedge members can then be placed separately at the respective guide member first (in their guidance) and can then be connected to each other.

In a preferred embodiment, the tensioning screw passes through the first and the second double wedge member. Advantageously, the tensioning screw provided for tensioning anyway is used twice, which can reduce the number of individual parts and the complexity. In general, however, it would also be possible to connect the first and the second double wedge member in a different way, for example by a separate screw or by riveting.

In a preferred embodiment, the tensioning section comprises a further wedge element axially opposite to the first wedge element. It is guided at a further wedge member, also along a movement way having a portion in the width direction. Preferably, the movement way of the first wedge member and that one of the further wedge member have an equal portion in the width direction, which allows for a uniform widening or narrowing and thus pressing. By turning the tensioning screw, the two wedge elements can be moved axially towards each other or away from each other (a right-hand-thread is preferred, and they are moved towards each other upon tightening).

At one wedge element, the head of the tensioning screw can find a contact (at least indirectly, for instance with a washer in between), upon the other wedge element the tensioning screw acts with its thread. The latter can occur indirectly, for instance via a nut placed separately at the wedge member. Preferably, the thread acts directly onto said wedge member, a corresponding thread can for instance be formed in the wedge element. However, the latter is not mandatory, for instance in case of a wedge element made of a synthetic material, a self-tapping tensioning screw could be applied (the wedge element could be provided without an opening at all or at least without an opening with a prefabricated internal thread).

Generally, the further wedge element is preferably constructed like the first wedge element, in particular as a double wedge, in particular multi-part. The first and the further wedge element are preferably mirror-symmetrical in terms of their movement ways with respect to a mirror perpendicular to the ring axis, which passes through the axial center off the tensioning ring. With respect to said plane, also the guide members of the one wedge element are preferably mirror-symmetrical to those of the other one. Preferably, the first and further wedge element are identical in construction, at least apart from the opening(s) for the tensioning screw (these are usually formed by mechanical finishing). In general, however, a second wedge element is not mandatory, the tensioning screw could for instance also be supported on a rail which is in a fixed relative position to the tensioning ring, wherein a possible relative displacement of the wedge element in the circumferential direction could be taken into account by providing an elongated hole.

In general, independently of whether the wedge element is designed as a double wedge and/or provided in combination with a further wedge element, a manufacturing of the wedge element in a forming or molding process can be preferred, such that a forming or molding tool releases the wedge element (in its final shape, at least apart from any usual mechanical finishing). If the wedge element is for instance made of a synthetic material, for example polyamide, in particular glass fiber reinforced polyamide, a manufacturing by injection molding is possible. If the wedge element is made of a metal, a metal casting or investment casting is possible, for instance aluminum die casting. If the wedge element is manufactured by injection molding, for instance a nut (for the tensioning screw) can be overmolded as an insert part. Alternatively, an additive manufacturing is possible, for instance 3D printing, which may be of interest due to the accessibility of more complex geometries. For a metal, for example laser sintering is an option.

In a preferred embodiment, the tensioning ring comprises a plurality of tensioning sections distributed over the circumference. In total, at least two tensioning sections are then provided, but also at least three or at least four tensioning sections are possible. Upper limits can for instance be not more than 10, 8 or 6 tensioning sections. In particular in case of a modular assembly (see below), however, even more tensioning sections are possible and upper limits can for instance be not more than 30, 25 or 20 tensioning sections. Regardless of their number, the tensioning sections are not necessarily evenly distributed over the circumference, even though this may be preferred in order to achieve as far as possible an even distribution of the contact pressure. The positions of the tensioning sections can then be rotationally symmetrical to each other, preferably even the tensioning sections as such are rotationally symmetrical to each other (not only their positions).

When a plurality of tensioning sections are used, their good axial accessibility mentioned above can be of a particular interest, because, on the one hand, all tensioning sections, in particular the tensioning screws, can be handled from the same direction (which would not be the case in case of a radial/circumferential accessibility). On the other hand, in case of such a radial/circumferential accessibility and a plurality of tensioning sections, the probability would be high that one or some of the tensioning sections would be arranged unfavorably close to for instance an adjacent wall (in a corner) or at a neighboring tube element or the like; this could then not be significantly improved by turning the tensioning ring, because then again other tensioning sections would be brought into the unfavorable position.

In a preferred embodiment, the tensioning ring comprises a plurality of tensioning ring segments. Therein, a first and a second tensioning ring segment are held together by a form-fit with respect to the circumferential direction (around the ring axis), namely with an undercut. In contrast to the wedge element and the guide member, the first and the second tensioning ring segment do not serve to change the width/circumference, but for a modular assembly. Accordingly, the form-fit is provided such that the first and the second tensioning ring segment are not displaceable with respect to each other at all or that a relative displacement does at least not change the extension of the assembled segments in the circumferential direction.

When viewed in a sectional plane perpendicular to the ring axis, the tensioning ring segments can engage in each other comparable to a T-profile, for example. Preferably, one tensioning ring segment is adapted as a male form-fit element at the corresponding circumferential side, and the other tensioning ring segment is designed as a female form-fit element at the corresponding circumferential side facing the male form-fit element. In general, each tensioning ring segment could have a male and also a female form-fit element at the connection location, such that they are pairwise complementary to each other. Then, an assembly by pushing them into each other actually would still be possible if for instance each of the segments would be divided into two parts with respect to the axial direction. Preferably, each of the segments is one-piece/monolithic, which can be of interest with respect to an overall simple structure.

Preferably, the tensioning ring segments can be made of a synthetic material, for instance a glass fiber reinforced plastic, such as glass fiber reinforced polyamide. Preferably, the wedge element and/or the guide member can then be made of a synthetic material as well. Basically, however, also a modular tensioning ring made of metal parts is possible, which can for instance be made by die-casting or additive manufacturing, e.g. laser sintering, in particular with regard to more complex geometries. Independently of these details, the first and second tensioning ring segment can, at their circumferential side opposite to the connection location, be either "neutral" again or be adapted for guiding a wedge element. Altogether, one or a plurality of neutral tensioning ring segments can be provided in the whole tensioning ring, which are integrated by a form-fit on both circumferential sides, but do not serve for a width adaption. Further, one or a plurality of tensioning ring segments can be provided in the tensioning ring, which form a tilted guidance on one circumferential side and are neutral at the other circumferential side. In particular in a modular tensioning ring, a plurality of tensioning sections can be provided.

The invention relates also to a set of a plurality of tensioning rings, which are constructed identical in terms of their tensioning sections. However, the tensioning rings can differ in their circumferential lengths taken in the circumferential direction of their respective tensioning straps. Thus, with the same structurally identical tensioning section, different tensioning rings can be realized by inserting tensioning straps (see above) having a different length. This modular principle allows for a variability, wherein the tensioning section, which is typically more complex compared to the remaining tensioning ring, does not have to be especially adapted. The tensioning rings of a corresponding set can also be provided with the tensioning ring segments described above, wherein preferably structurally identical tensioning ring segments are used in the tensioning rings, in a different number however. In this way, a tensioning ring having a larger width can be obtained by using a large number of "neutral" tensioning ring segments.

The invention also relates to the use of a tensioning ring disclosed here for pressing radially inwards or radially outwards. A tensioning ring according to the invention can be adapted for pressing in both directions, or it can be specially adapted for pressing either radially inwards or radially outwards, see the exemplary embodiment for illustration. Preferably, the tensioning ring is pressed against a tube element, namely against the inner wall or outer wall surface of the tube element (wherein it does not necessarily contact the respective surface, but it shall be pressed at least against it, e. g. towards it). Preferably, the ring axis can be identical to a length axis of the tube element (around which the latter is typically rotationally symmetrical) and/or a length axis of the line (along the length axis, the length of the line is taken).

The tube element can in particular be a part of an entry or a duct, with which a line is led through a wall or floor element. The line can for instance be a cable or a media pipe, the duct can for instance be a wall duct; if the latter is provided for a building wall, the tube element can be structurally integrated into this building wall, for instance be set in concrete. The tensioning ring can in particular be used for applying pressure to a body which is softer compared to the tube element, the body having at least in a portion a sleeve-like shape, even though it can be more complex as a whole. By the tensioning ring, the (softer) sleeve can then be pressed against the (harder) tube element, for instance against the inner or outer wall surface.

BRIEF DESCRIPTION OF THE DRAWINGS

Below, the invention is explained in more detail by means of exemplary embodiments, wherein the individual features can, within the scope of the independent claims, also be relevant for the invention in a different combination, and wherein no difference is made between the different claim categories.

In detail, it is shown in.

DETAILED DESCRIPTION OF THE PREFERRED EMBODIMENTS

Figure 1:
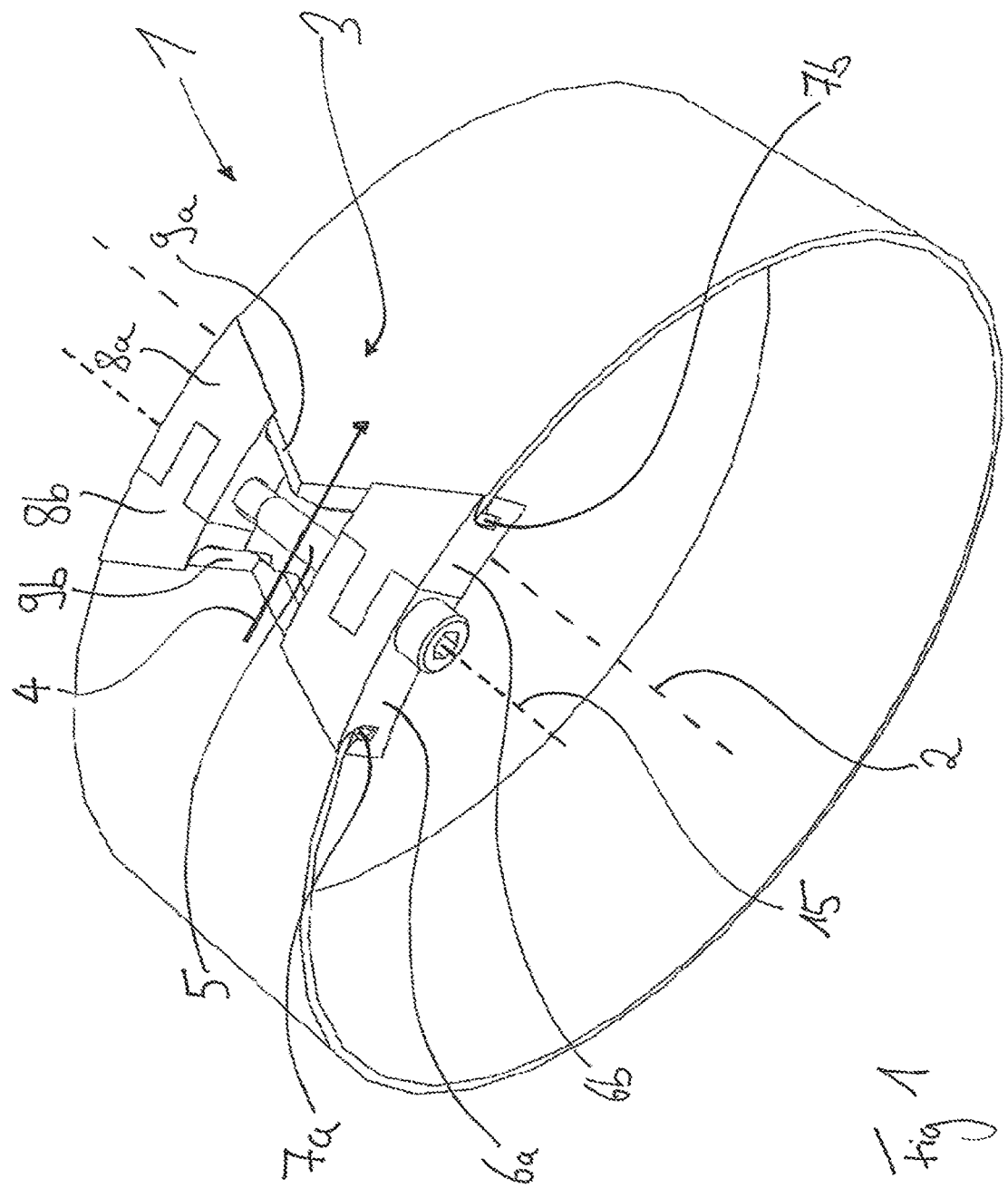
FIG. 1 a tensioning ring according to the invention in an oblique view.

FIG. 1 shows a tensioning ring 1 according to the invention in an oblique view, looking onto it obliquely to a ring axis 2. The tensioning ring 1 comprises a tensioning section 3, wherein the width thereof, which is taken in a width direction 4, can be changed by tightening a tensioning screw 5. For that purpose, the tensioning section 3 comprises a wedge element 6 which is guided movable at guide members 7a,b. Below, reference is additionally made to FIG. 2. The wedge element 6 is respectively guided at the respective guide member 7a,b along a movement way 20a,b. As apparent from FIG. 2, the movement ways 20a,b respectively have a portion in the width direction 4 so that the axial displacement of the wedge element 6 changes also the width of the tensioning section 3.

In the example here, a thread 5a of the tensioning screw 5 is a right-hand thread, so that the wedge element 6 is moved towards the axial center of the tensioning ring 1 when the tensioning screw 5 is tightened (by a clockwise rotation at the screw head 5b). Thereby, the guide members 7a,b are pushed away from each other, the circumference of the tensioning ring 1 increases. The tensioning ring 1 shown here can in particular be used for pressing radially outwards. It can for instance be inserted into a rubber or elastomer sleeve and be inserted together with the latter into a tube element; by tightening the tensioning screw 5, the circumference of the tensioning ring 1 is widened and the sleeve is pressed against the inner wall surface of the tube element.

The tensioning section 3 comprises a further wedge element 8, which is also guided at guide members 9a,b. Also in this case, the corresponding movement ways, are oriented obliquely to the ring axis 2 or turning axis 15 of the tensioning screw 5, but they are not shown in FIG. 2 for the sake of clarity. When the tensioning screw 5 is tightened, both wedge elements 6, 8 are moved axially towards each other so that the guide members 7a,b and 8a,b are pushed away from each other in the width direction and the circumference of the tensioning ring 1 is widened.

The wedge elements 6, 8 are multi-part respectively, namely are respectively made of a first double wedge member 6a, 8a and a second double wedge member 6b, 8b. When assembling the tensioning section 3, the double wedge members 6a,b, 8a,b are first placed on or threaded onto their respective guide member 7a,b, 9a,b, see also the axial view according to FIG. 3 for illustration. The multi-part construction of the wedge elements 6, 8 simplifies the placement on the guide members. Subsequently, the wedge elements 6, 8 are respectively assembled, the double wedge members 6a,b or 8a,b are pushed into each other in the circumferential direction. Subsequently, the tensioning screw 5 is inserted, intersecting and holding together respectively both double wedge members 6a,b or 8a,b at each wedge element 6, 8.

Below, reference is particularly made to FIG. 3. The present tensioning ring 1 is to a large extent over its circumference formed by a tensioning strap 30 which is made of metal. In detail, it is made of a steel sheet brought into the ring-shape by bending. The joint ends 30a,b of the tensioning strap 30 are bent radially inwards so that the tensioning strap 30 itself forms the guide members 7a,b (and also 9a and 9b).

Generally, namely also in case of guide members 7a,b which are multi-part to the tensioning strap 30 (see for instance FIG. 6 for illustration), the wedge elements 6, 8 are held together with the guide members 7, 9 by an undercut in a form-fit manner (with respect to width direction 4). The wedge elements 6, 8 are consequently guided at the guide members 7, 9, independently of whether the tensioning ring is widened (in FIG. 2 by tightening the tensioning screw 5 and moving the wedge elements 6, 8 towards each other) or narrowed. The wedge elements 6, 8 can also pull the guide members 7a,b or 9a,b towards each other in the width direction 4.

Figure 2:
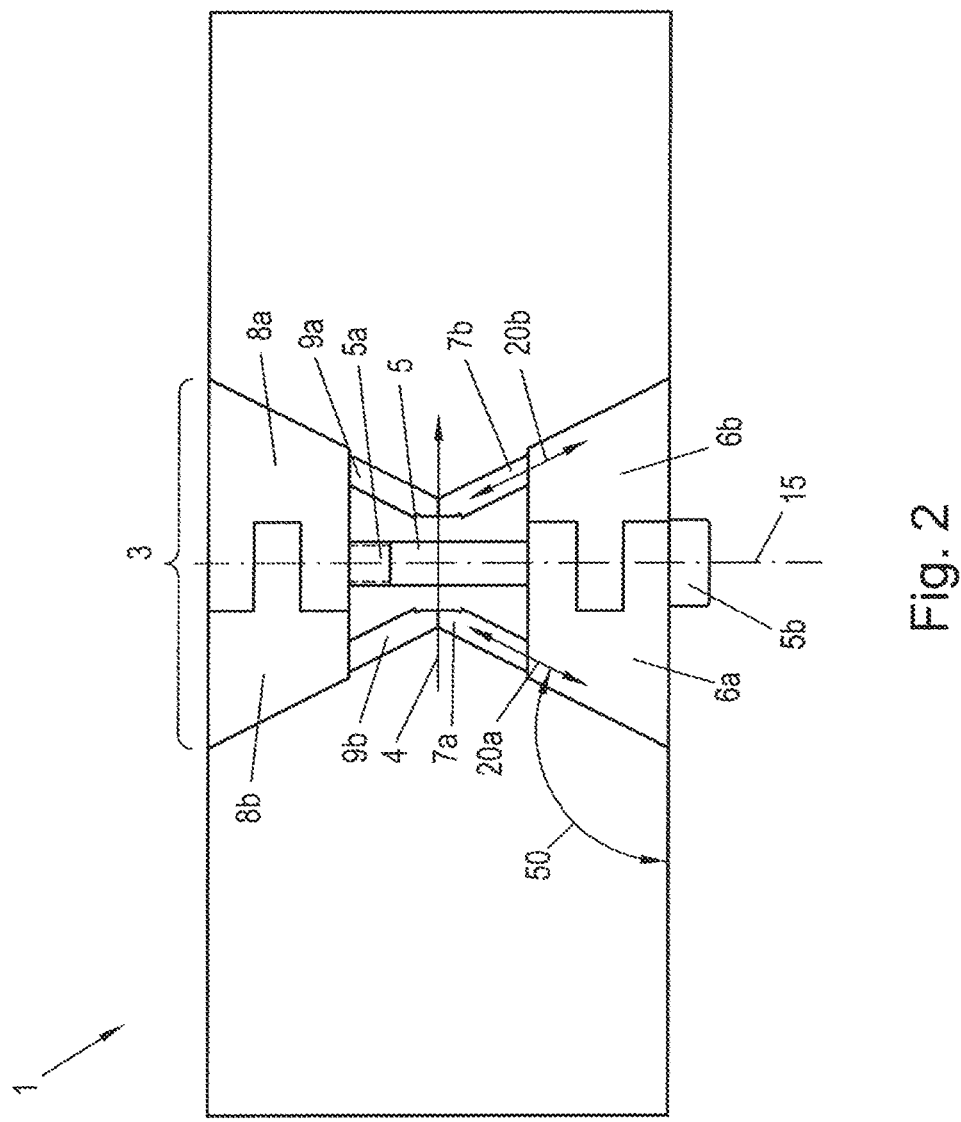
FIG. 2 the tensioning ring of FIG. 1, in particular its tensioning section, in a view radially from the outside.
Figure 3:
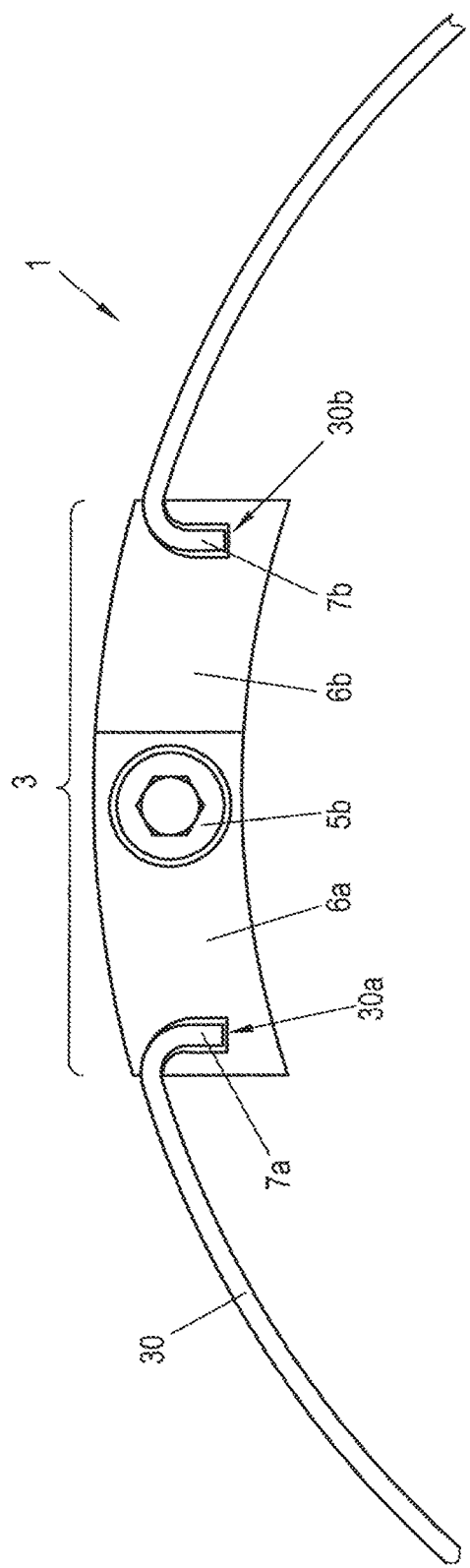
FIG. 3 the tensioning ring of FIG. 1, in detail its tensioning section, in an axial view.
Figure 4:
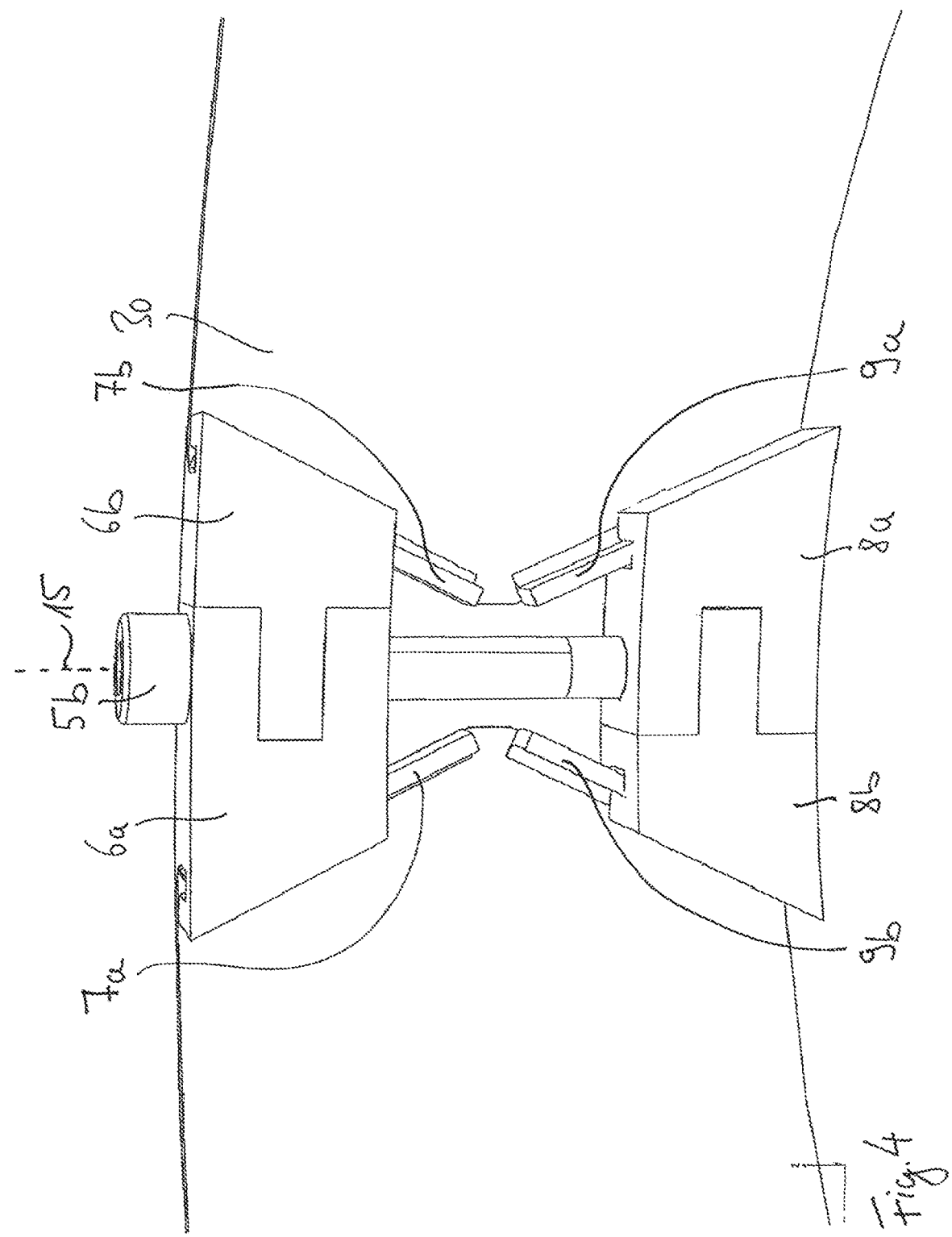
FIG. 4 the tensioning ring of FIG. 1, in detail its tensioning section, in a view looking from the inside radially outwards.

FIG. 4 shows again the same tensioning ring like FIGS. 1 to 3, but in a view looking from the inside outwards, namely from the ring axis 2 radially outwards. Here it can be seen how the guide members 7a,b, 9a,b are formed by bending the tensioning strap 30 radially inwards, namely towards the viewer. The viewing direction in FIG. 4 is onto the joint ends of the tensioning strap 30.

Figure 5:
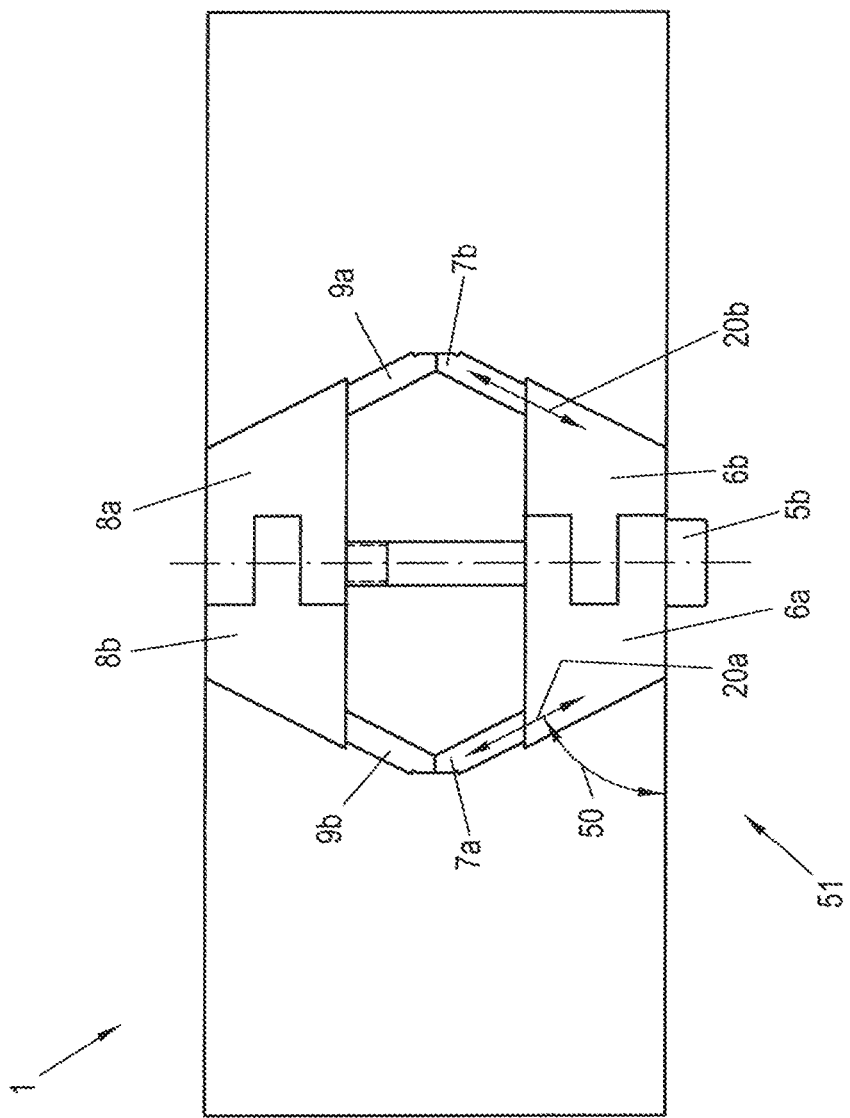
FIG. 5 a further tensioning ring according to the invention, in a view like in FIG. 2.

FIG. 5 shows a further tensioning ring 1 which is to a large extent comparable to the tensioning ring 1 discussed so far. Generally, in this disclosure, parts having the same or basically the same function are referenced by the same reference numerals. To summarize, the main difference is the orientation of the movement ways 20a,b. In case of the variant of FIG. 5, the movement ways respectively enclose outside of the respective wedge element 6, 8 an acute angle 50 with the front face 51 of the tensioning ring 1. Thus, the guidance formed by the guide members narrows axially outwards. For comparison, reference is made to FIG. 2 where the angle 50 is obtuse, the guidance widening axially outwards.

As a result, in the variant of FIG. 5, the guide members 7a and b or 9a and b are not pushed away from each other when the wedge elements 6, 8 are moved towards each other, the guide members are pulled towards each other instead. Thus, the width of the tensioning section 3 and the circumference of the tensioning ring 1 decreases when the wedge elements 6, 8 are moved towards each other, which is exactly the opposite to the variant of FIG. 2. By a respective orientation of the movement ways, the tensioning ring 1 can be designed such that it is either widened (FIG. 2) or narrowed (FIG. 5) when the tensioning screw 5 with the right-hand thread is tightened (clockwise rotation), wherein both is possible with a clockwise rotation.

Figure 6:
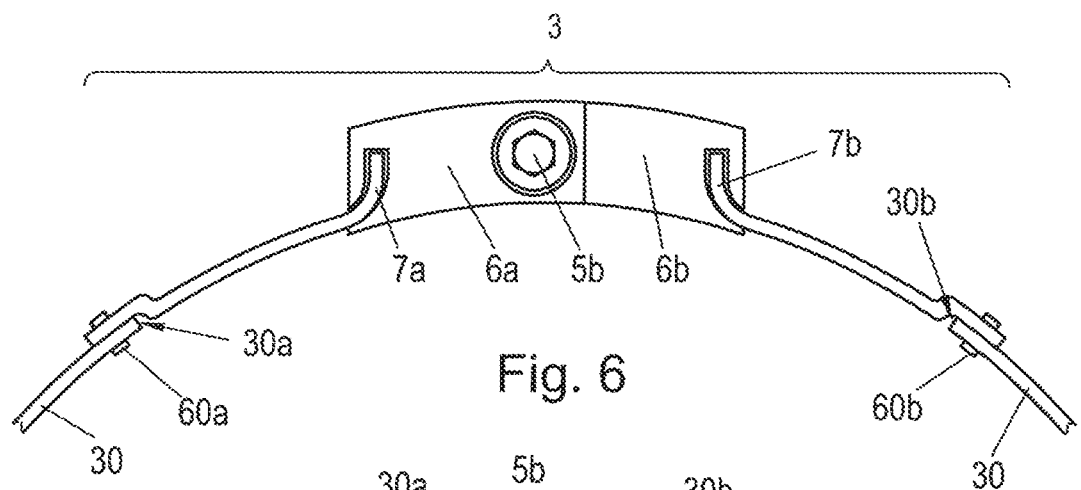
FIG. 6 a further tensioning ring according to the invention, in a view like in FIG. 3.

In case of the variant of FIG. 6, the guide members 7a,b are not formed by the tensioning strap 30 itself. Instead, the guide members 7a,b are separate elements placed at the tensioning strap 30. With a respective rivet 60a,b, the guide members 7a,b are fixed at the tensioning strap 30, wherein a fixation by for instance screwing or the like will also be possible. During assembly, in case of the variant of FIG. 6, the tensioning section 30 could also be assembled first, namely before the guide members 7a,b are fixed at the tensioning strap 30. Likewise, a simplified threading would be possible even without the two-part design of the wedge element 6.

The variant of FIG. 6 differs from that of FIG. 3 in so far as the L-profiles of the guide members 7a,b are not oriented radially inwards, but radially outwards. Accordingly, in case of the variant of FIG. 6, the radially inner wall surface of the wedge element 6 forms a smooth or step-free transition with the respectively horizontal leg of the L-profile (not with the leg oriented respectively outwards). Thus, the tensioning ring of FIG. 6 is in particular adapted for being pressed inwards, because it allows for an even transfer of the pressing force there. For comparison, in case of the variant of FIG. 3, the respective horizontal leg of the L-profile forms a smooth transition with the wall surface of the wedge element 6 facing radially outwards, such that the tensioning ring is in particular adapted for being pressed radially outwards. Even though the tensioning ring is specially adapted for being pressed radially inwards or outwards, it can be advantageous in terms of a demounting or review, when it is also held together by the form-fit in the opposite direction.

Figure 7:
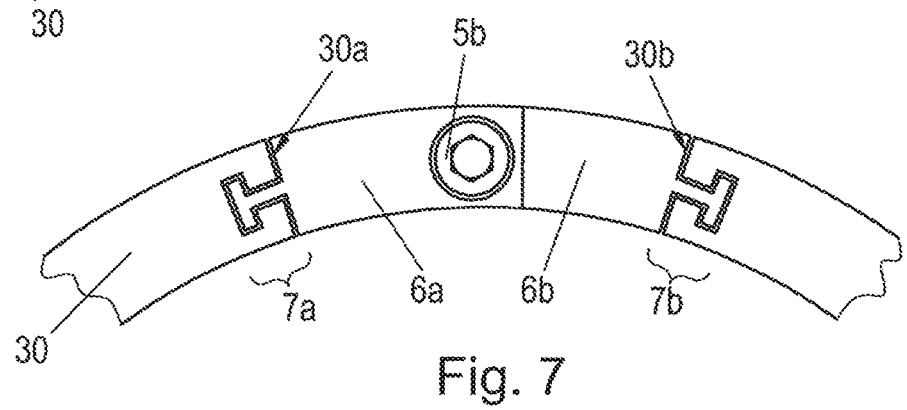
FIG. 7 a further tensioning ring according to the invention, again in a view like in FIG. 3.

In case of the variant of FIG. 7, the tensioning strap 30 is not made of metal, instead it is an injection molded synthetic material ring made of glass fiber reinforced polyamide. Again, the guide members 7a,b are provided at the joint ends 30a,b, namely as female form-fit elements. Accordingly, the wedge element 6 forms male form-fit elements which are T-shaped in a sectional view and engage in the pockets of the guide members 7a,b, being held there by a form-fit. The pockets can be introduced into the tensioning ring already upon an injection molding.

Generally, the wedge elements 6, 8 can be made of metal, or they can be injection-molded of a synthetic material instead (in particular of a glass fiber reinforced polyamide), also in combination with a tensioning strap made of metal. In its functionality, the variant of FIG. 7 does not differ from the concepts discussed so far, the wedge element 6 (and the wedge element 8 arranged in FIG. 7 behind) are brought towards each other by tightening the tensioning screw 5, such that the width either increases or decreases depending on the orientation of the movement way (obtuse or acute angle, see above).

Figure 8:
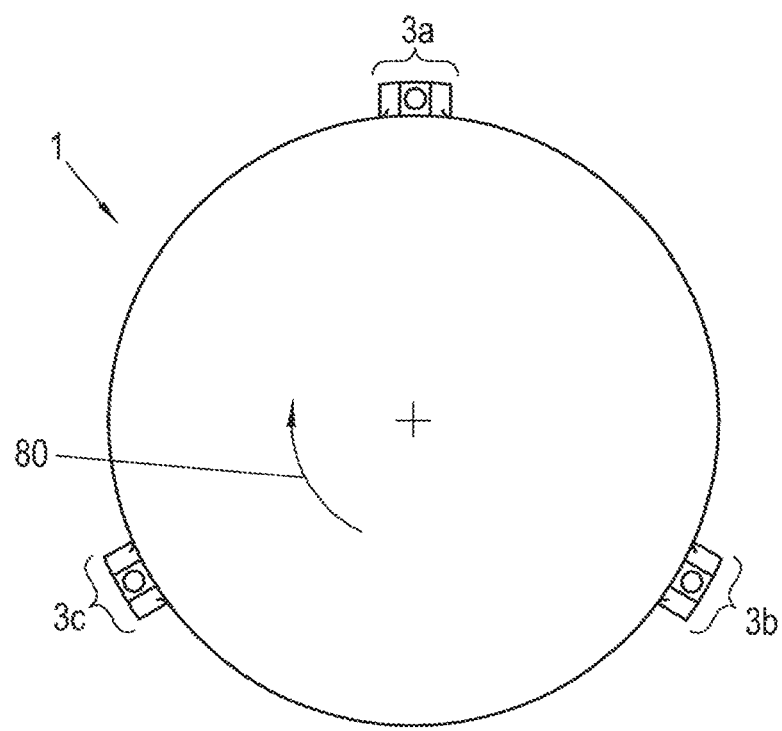
FIG. 8 a further tensioning ring according to the invention in an axial schematic view.

FIG. 8 shows a further tensioning ring 1 in a schematic view, which comprises in contrast to the variant of FIG. 1 not only one tensioning section 3, but three tensioning sections 3a,b,c in total. Those are arranged evenly distributed over the circumference 80, which results in a uniform distribution of the pressing force. The tensioning ring shown schematically is adapted for being pressed radially inwards, but a tensioning ring 1 with a multiple tensioning (a plurality of tensioning sections) can also be realized with any one of the variants discussed above.

Figure 9A:
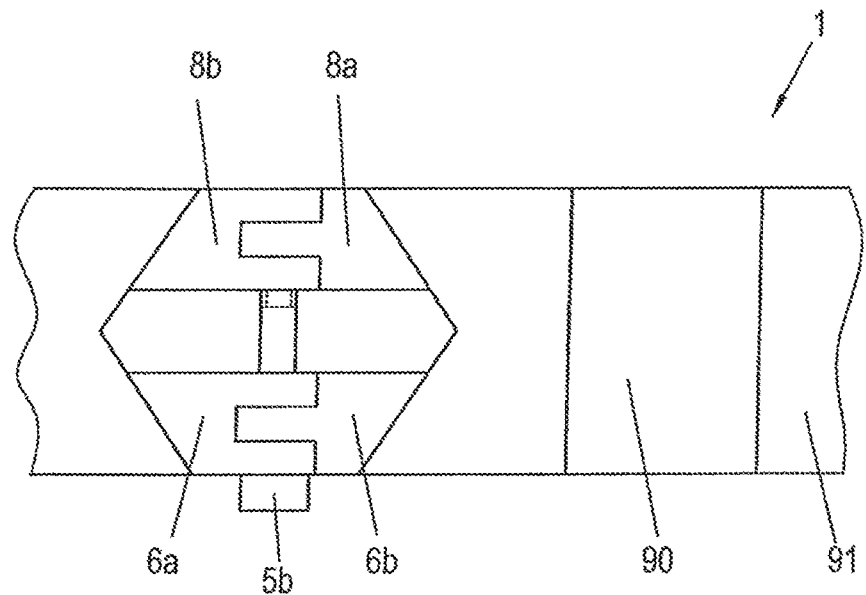
FIG. 9a a further tensioning ring according to the invention or segments thereof in a radial view.
Figure 9B:
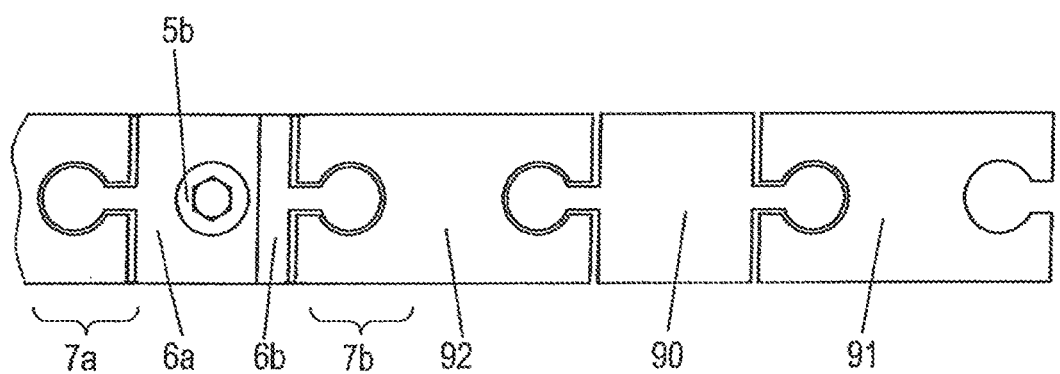
FIG. 9b the tensioning ring of FIG. 9a in an axial view.

FIGS. 9a,b illustrate a modular tensioning ring 1 or a portion thereof. Therein, FIG. 9a shows a view looking radially inwards, and FIG. 9 shows an axial view. Like the variants discussed so far, also the tensioning ring 1 comprises a tensioning section 3 with wedge elements 6, 8 and corresponding guide members 7, 9. In so far, reference is in particular made to the explanation relating to FIG. 7.

Apart from that, the tensioning ring 1 of FIG. 9a,b is made of modules, it comprises a first 90 and a second tensioning ring segment 91. Also these engage in each other by a form-fit, however this form-fit does only serve for holding them together in the circumferential direction. In the present design, the first 90 and the second tensioning ring segment 91 can be displaced with respect to each other in the axial direction, which would however not change the width taken in the circumferential direction. Further, a third form-fit element 92 is provided, which is in the like manner assembled "neutrally" (not for a variable width adjustment) with the first tensioning ring segment 90 at one circumferential side. However, at the opposite circumferential side, the second double wedge member 6b is guided obliquely as described above (for a width adaption).

The invention claimed is:

1. A tensioning ring (1) having a tensioning section (3), the tensioning section (3) comprising a wedge element (6), a guide member (7a) and a tensioning screw (5), wherein a width of the tensioning section (3) and thus a circumference of the tensioning ring (1) can be changed by tightening the tensioning screw 5, for which purpose the wedge element (6) is guided at the guide member (7a) and is movable in this guide along a movement way (20a) at the guide member (7a) by tightening the tensioning screw (5), the movement way (20a) having a portion in a width direction (4) determining the width of the tensioning section (3), wherein the wedge element (6) and the guide member (7a) engage in one another with an undercut in such a way that they are held together in a form-locking manner with respect to the width direction (4), wherein the wedge element (6) and the guide member (7a) are held together in a form-locking manner when the tensioning section (3) is narrowed and also when the tensioning section (3) is widened, and wherein said tensioning ring (1) is configured such that tightening the tensioning screw (5) expands said tensioning ring (1) radially outwards relative to a ring axis (2), wherein the guide member (7a) has the shape of an L-profile which engages in the wedge element (6) in such a way that one leg of the L-profile is coextensive with a wall surface of the wedge element (6).

2. A tensioning ring (1) having a tensioning section (3), the tensioning section (3) comprising a wedge element (6), a guide member (7a) and a tensioning screw (5), wherein a width of the tensioning section (3) and thus a circumference of the tensioning ring (1) can be changed by tightening the tensioning screw 5, for which purpose the wedge element (6) is guided at the guide member (7a) and is movable in this guide along a movement way (20a) at the guide member (7a) by tightening the tensioning screw (5), the movement way (20a) having a portion in a width direction (4) determining the width of the tensioning section (3), wherein the wedge element (6) and the guide member (7a) engage in one another with an undercut in such a way that they are held together in a form-locking manner with respect to the width direction (4), wherein the wedge element (6) and the guide member (7a) are held together in a form-locking manner when the tensioning section (3) is narrowed and also when the tensioning section (3) is widened, and wherein said tensioning ring (1) is configured such that tightening the tensioning screw (5) expands said tensioning ring (1) radially outwards relative to a ring axis (2), wherein said guide member (7a) is a first guide member (7a), the wedge element (6) is provided in the shape of a double wedge, being also movable on a side opposite to the first-guide member (7a) in the width direction (4) at a second guide member (7b) of the tensioning section (3) along a second movement way (20b) with a portion in the width direction (4), wherein the double wedge-shaped wedge element (6) includes a first double wedge member (6a) being guided at the first guide member (7a) and a second double wedge member (6b) being guided at the second guide member (7b).

3. The tensioning ring (1) of claim 2, wherein the tensioning screw (5) passes through the first and the second double wedge member (6a, 6b) and holds them together in the width direction (4).

\* \* \* \* \*